US009969414B2

(12) United States Patent
Kelly et al.

(10) Patent No.: US 9,969,414 B2
(45) Date of Patent: May 15, 2018

(54) DOLLY PALLET ASSEMBLY

(71) Applicant: Daniel Kelly, Medford, NJ (US)

(72) Inventors: Daniel Kelly, Medford, NJ (US); John A. Spadavecchia, Red House, VA (US); James Favaron, Columbia, SC (US); Steven Kurth, Muskego, WI (US); Jeffery Jacobs, Lexington, SC (US)

(73) Assignee: Daniel Kelly, Medford, NJ (US)

(*) Notice: Subject to any disclaimer, the term of this patent is extended or adjusted under 35 U.S.C. 154(b) by 225 days.

(21) Appl. No.: 13/804,604

(22) Filed: Mar. 14, 2013

(65) Prior Publication Data
US 2014/0033956 A1 Feb. 6, 2014

Related U.S. Application Data

(60) Provisional application No. 61/677,738, filed on Jul. 31, 2012.

(51) Int. Cl.
B65D 19/44 (2006.01)
B62B 3/00 (2006.01)
B65D 19/00 (2006.01)
B62B 3/04 (2006.01)
B65D 85/30 (2006.01)
B62B 5/00 (2006.01)
B62B 5/04 (2006.01)

(52) U.S. Cl.
CPC .............. *B62B 3/005* (2013.01); *B62B 3/00* (2013.01); *B62B 3/04* (2013.01); *B62B 5/0093* (2013.01);
(Continued)

(58) Field of Classification Search
CPC . B62D 3/005; B62D 3/00; B62D 3/04; B65D 19/44; B65D 19/0004; B65D 2519/00815
(Continued)

(56) References Cited

U.S. PATENT DOCUMENTS 1,004,114 A * 9/1911 Verplanck ........................ 104/44
1,261,681 A * 4/1918 Barnett ...................... B60P 1/43
188/32

(Continued)

FOREIGN PATENT DOCUMENTS

DE    10 2011 054 255    * 11/2013
GB         2416527       *  2/2006
(Continued)

OTHER PUBLICATIONS

International Search Report and Written Opinion dated Nov. 6, 2013 in International Application No. PCT/US2013/052907 (14 pages).

Primary Examiner — Daniel J Troy
Assistant Examiner — Timothy M Ayres
(74) Attorney, Agent, or Firm — Massina Pat & TM Law

(57) ABSTRACT

A dolly pallet assembly including a pallet having a pallet body defining a bottom surface and at least two channels therein. Each channel includes side walls and a channel bottom surface spaced a first height relative to the pallet body bottom surface. An entry into each channel is defined in the body and includes a ramped surface which slopes from a second height relative to the pallet body bottom surface at the entry to a third height relative to the pallet body bottom surface adjacent the channel bottom surface, wherein the second height is less than the first and third heights. The dolly includes a support platform with a plurality of wheel assemblies and at least one locking member, wherein the dolly is positionable relative to the pallet with the wheels received in respective channels and the locking member selectively engageable to lock the dolly relative to the pallet.

19 Claims, 13 Drawing Sheets

(52) U.S. Cl.
CPC .......... *B62B 5/049* (2013.01); *B65D 19/0004* (2013.01); *B65D 19/44* (2013.01); *B65D 85/302* (2013.01); *B65D 85/305* (2013.01); *B65D 2519/00034* (2013.01); *B65D 2519/00069* (2013.01); *B65D 2519/00333* (2013.01); *B65D 2519/00805* (2013.01); *B65D 2519/00815* (2013.01)

(58) Field of Classification Search
USPC .... 108/51.11, 55.1, 55.3, 55.5, 57.13, 57.15, 108/57.16
See application file for complete search history.

(56) References Cited

U.S. PATENT DOCUMENTS

| | | | |
|---|---|---|---|
| 2,847,092 A * | 8/1958 | Noyes | B62B 5/049 188/5 |
| 3,833,138 A * | 9/1974 | Dean | 414/430 |
| 6,006,675 A | 12/1999 | Heil | |
| 6,026,958 A * | 2/2000 | Kelly | B65D 1/243 206/3 |
| 6,524,040 B1 | 2/2003 | Heil | |
| 6,851,563 B1 * | 2/2005 | Lipari | 211/74 |
| 7,926,145 B2 * | 4/2011 | Liao | B60B 33/0018 16/18 R |
| 2003/0097967 A1 | 5/2003 | Underbrink et al. | |
| 2008/0156758 A1 * | 7/2008 | Mollard et al. | 211/151 |
| 2010/0310352 A1 * | 12/2010 | Moberg | 414/800 |
| 2013/0327735 A1 * | 12/2013 | Gronholm et al. | 211/85.8 |

FOREIGN PATENT DOCUMENTS

| | | |
|---|---|---|
| JP | 2003-205942 A | 7/2003 |
| JP | 2005-271953 A | 10/2005 |

* cited by examiner

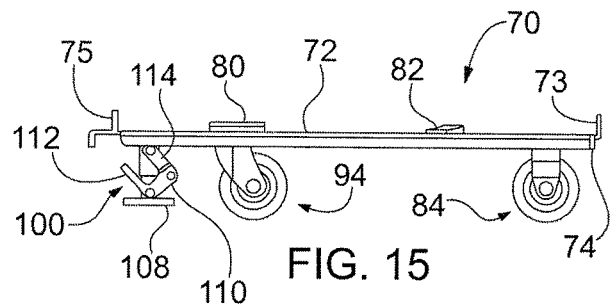
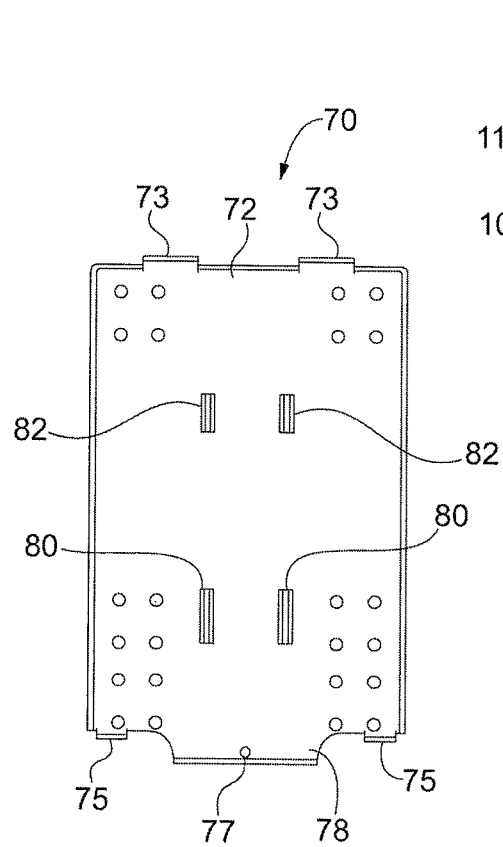
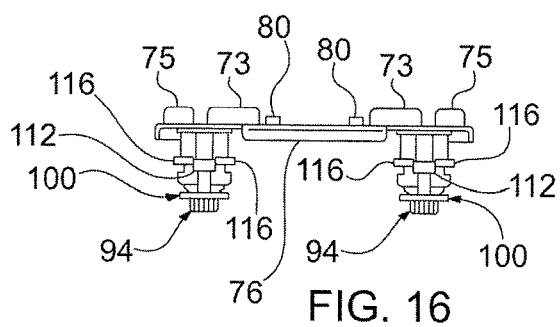
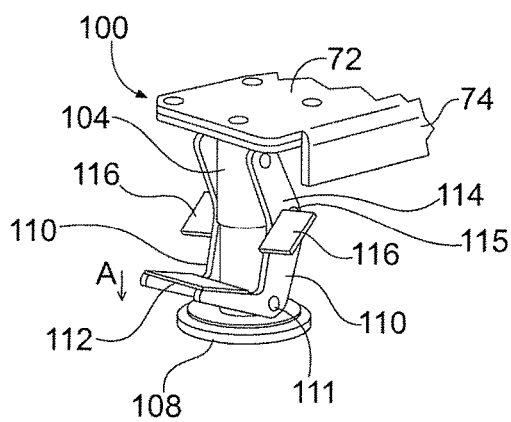
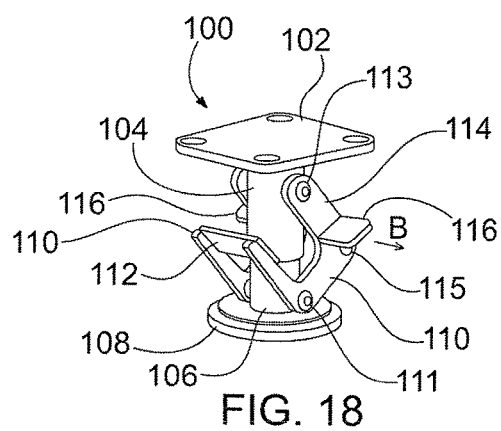

DOLLY PALLET ASSEMBLY

This application claims the benefit of U.S. Provisional Patent Application No. 61/677,738 filed on Jul. 31, 2012, the contents of which are incorporated herein by reference.

FIELD OF THE INVENTION

This invention relates to a dolly pallet assembly for supporting and transporting items. In particular, this invention relates to an assembly including a pallet configured to receive and lockingly position a wheeled dolly relative thereto such that the pallet and dolly may be moved as a unit or the dolly may be moved independently of the pallet.

BACKGROUND OF THE INVENTION

The shipping industry typically packages items into groups that can be supported on a pallet for transportation from one location to another location. A single large item or multiple smaller items are positioned on a pallet which has openings configured to receive forks or tines from a forklift, pallet jack or other piece of bulk handling equipment. Once the bulk handling equipment is positioned relative to the pallet, the forks or tines are lifted whereby the pallet and the items thereon are lifted. During the loading procedure, the loading area must be large enough for the pallet to be positioned and also for the bulk handling equipment to position relative thereto. As such, the items to be transported must be stored in this large area or moved to this area, typically by carrying the items or loading and unloading the items on an intermediate mover, for example a dolly or hand truck. The additional loading and unloading adds time and cost in additional labor.

Once the pallet is loaded, it may then be moved via the bulk handling equipment from the loading area to a transportation unit, for example a truck, train car or cargo ship. Once the transportation unit reaches its destination, another piece of bulk handling equipment must be used to unload the pallet from the transportation unit and move it to its final destination. In some instances, the bulk handling equipment may not be available, in which case the items may have to be unloaded one at a time and moved to the final location. In some cases, even when the bulk handling equipment is available, the destination may not have room for the bulk handling equipment to maneuver to the final location for the items, so again, it is necessary to remove the items from the pallet and then transport them to the final location.

SUMMARY OF THE INVENTION

Briefly, the present invention provides a dolly pallet assembly including a wheeled dolly which may be loaded and moved onto and locking secured relative to the such that the pallet and dolly may be moved as a unit. Once at a desired destination, the dolly may be moved independently of the pallet.

In one aspect, the invention provides a pallet including a pallet body defining a bottom surface and at least two channels therein, each channel including side walls and a channel bottom surface spaced a first height relative to the pallet body bottom surface, and an entry into each channel, the entry including a ramped surface which slopes from a second height relative to the pallet body bottom surface at the entry to a third height relative to the pallet body bottom surface adjacent the channel bottom surface, wherein the second height is less than the first and third heights.

In another aspect, the invention provides a dolly pallet assembly comprising a pallet including a pallet body defining a bottom surface and at least two channels therein, each channel including side walls and a channel bottom surface spaced a first height relative to the pallet body bottom surface, and an entry into each channel, the entry including a ramped surface which slopes from a second height relative to the pallet body bottom surface at the entry to a third height relative to the pallet body bottom surface adjacent the channel bottom surface, wherein the second height is less than the first and third heights, wherein a locking recess is defined in the pallet body adjacent at least one of the entries; and a dolly including a support platform with a plurality of wheel assemblies and at least one locking member, wherein the dolly is positionable relative to the pallet with the wheels received in respective channels and the locking member selectively engageable with the locking recess to lock the dolly relative to the pallet.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 14 is a top plan view of the exemplary dolly of FIG. 12.

FIG. 15 is a side elevation view of the exemplary dolly of FIG. 12.

FIG. 16 is a front elevation view of the exemplary dolly of FIG. 12.

FIG. 17 is an isometric view illustrating an exemplary locking member in a locking position.

FIG. 18 is an isometric view illustrating the exemplary locking member of FIG. 17 in a move position.

DETAILED DESCRIPTION OF THE INVENTION

Figure 1:
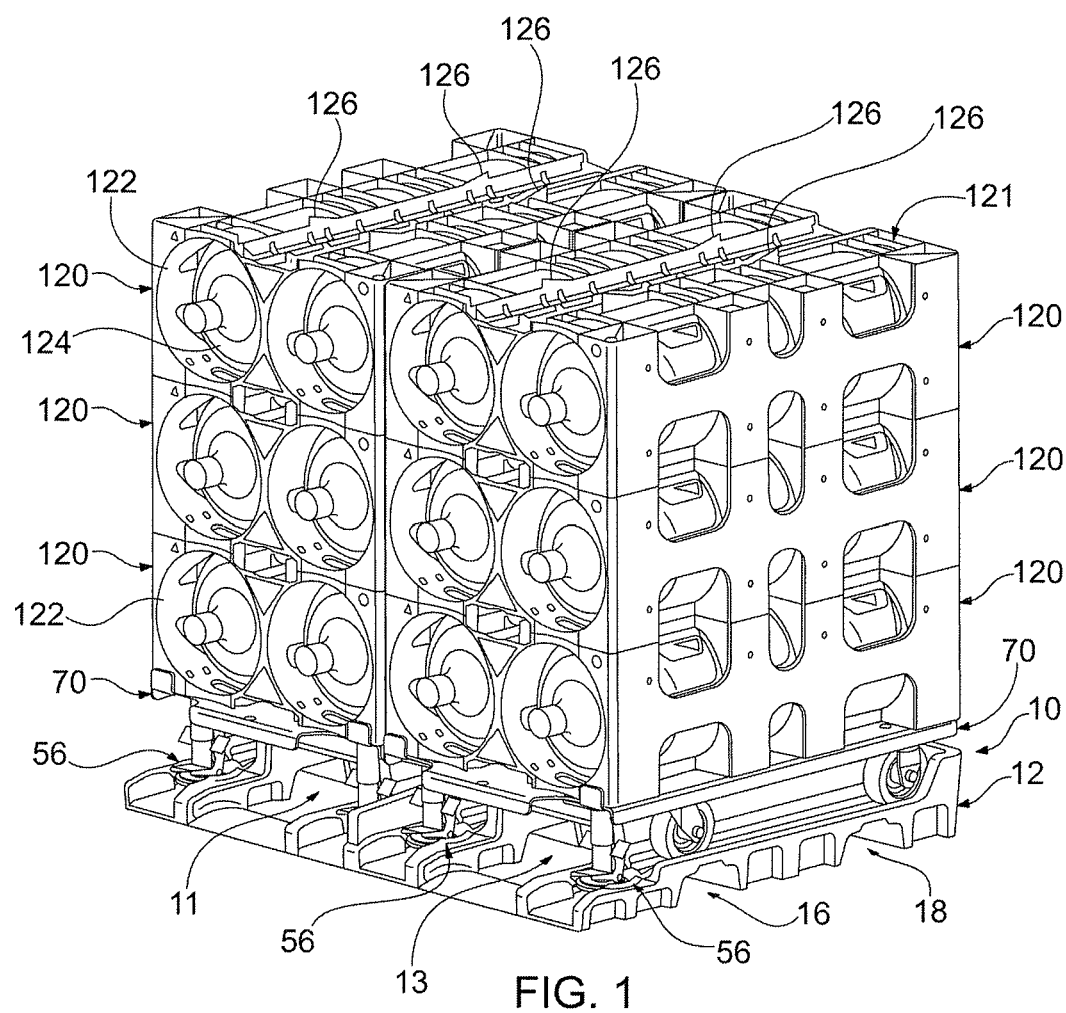
FIG. 1 is an isometric view of a dolly pallet assembly in accordance with an embodiment of the invention supporting exemplary bottled water storage racks.
Figure 2:
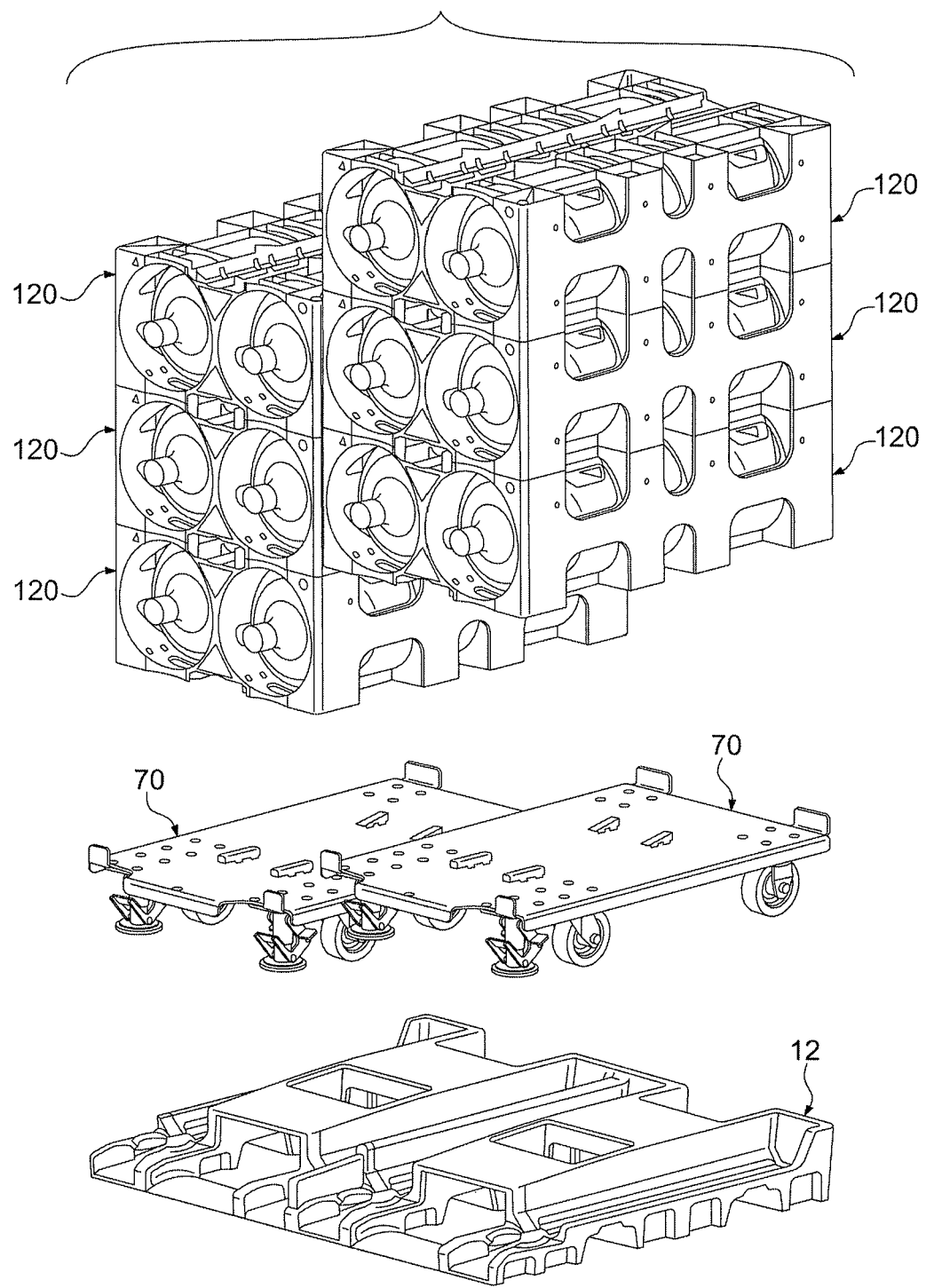
FIG. 2 is an exploded view of the assembly of FIG. 1.

In the drawings, like numerals indicate like elements throughout. Certain terminology is used herein for convenience only and is not to be taken as a limitation on the present invention. For example, the terms front, back, left and right are utilized herein to assist with understanding of relative positioning, but are not intended to be limiting to an orientation of use of the device. The following describes a preferred embodiment of the present invention. However, it should be understood, based on this disclosure, that the invention is not limited by the preferred embodiment described herein.

Referring to FIGS. 1-4, an exemplary embodiment of a dolly pallet assembly 10 is shown supporting a plurality of exemplary bottled water storage racks 120. The dolly pallet assembly 100 of the present embodiment generally includes a pallet 12 and one or more dollies 70. In the illustrated embodiment, the pallet 12 is configured to receive and support two dollies 70, however, the pallet 12 may be configured to support fewer or more dollies.

Figure 5:
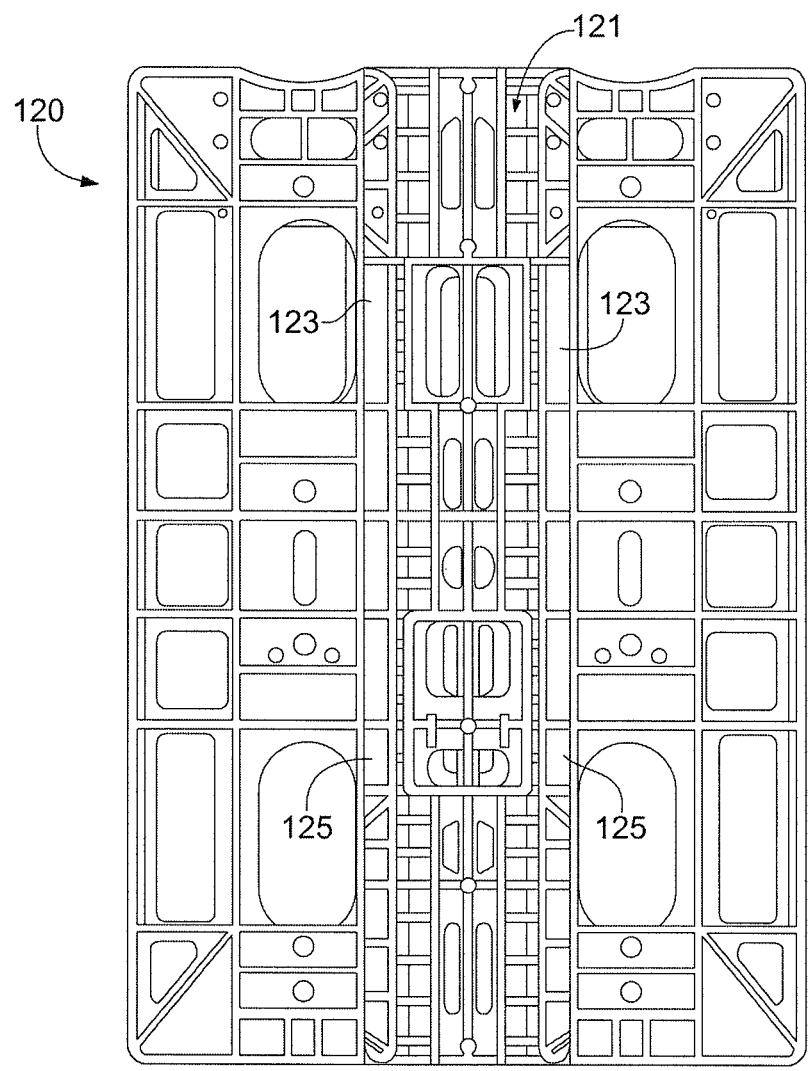
FIG. 5 is a bottom plan view of an exemplary bottled water storage rack.

In the exemplary embodiment, each dolly 70 is configured to support a plurality of bottled water storage racks 120, three as illustrated. Each storage rack 120 includes two apertures, with each aperture 122 configured to receive two water bottles 124. The exemplary storage racks 120 have a rib structure 121 with engaging projections 106 along the top surface and corresponding receiving slots 123, 125 along the bottom surface (see FIG. 5). When the racks 120 are stacked, the projections 126 of a lower rack 120 engage the slots 123, 125 of a rack 120 above to maintain the stacked configuration. While the invention is illustrated and described herein in conjunction bottled water storage racks 120, the invention is not limited to such, and the dollies 70 may be utilized to support and move different items, whether in racks or not. Additionally, while the illustrated racks 120 are plastic racks, the invention is not limited to such and the racks may be of any material, including metal. Additionally, while the racks 120 are illustrated as separate components stacked on the dollies 70, the racks may be formed integral with the dollies and may include any number of apertures, slots, shelves or the like.

Referring to FIGS. 6-11, an exemplary pallet 12 will be described. The pallet 12 is preferably manufactured from a polymer material, for example a plastic or thermoplastic material, but may be manufactured from other materials as well. The pallet 12 has a pallet body 14 including three lateral beams 15, 17 and 19 extending laterally between two side channels 23 with two intermediate channels 24 therebetween. This configuration facilitates two dollies 70 as illustrated, however, the pallet 12 may be formed with only two channels to receive a single dolly or may be formed with more than four channels to receive more than two dollies. In the present embodiment, the beams 15, 17 and 19 and the channels 23, 24 are formed integrally, however, they may be formed as separate components and joined together. The beams 15, 17 and 19 define a lower surface of the pallet 12 which extends along a plane P (see FIGS. 10 and 11). Lateral openings 16 and 18 are defined between the beams 15, 17 and 19. The lateral openings 16 and 18 are configured to receive forklift tines or the like to lift and move the pallet 12. Longitudinal openings 11 and 13, which will be described hereinafter, are also configured to receive forklift tines or the like so the pallet 12 may be accessed by a forklift or the like from any side.

Each of the channels 23, 24 extends from a rear wall 30 to a ramped opening 50. The side channels 23 include an outer wall 25 and an inner wall 27 extending forward from the rear wall 30. The outer walls 25 may be formed with a reduced height as illustrated in FIGS. 1-7 or may be formed with a configuration similar to the inner wall 27 as illustrated in FIGS. 8-11. The outer wall 25 and inner wall 27 each have an inward tapered portion 29 at the lower end thereof with a longitudinal gap 31 defined between the opposed tapered portions 29. Similarly, the intermediate channels 24 each have an inner wall 27 with an inward tapered portion 29 at the lower end thereof. The intermediate channels 24 share a common wall 28 which has an inward tapered portion 29 on each side thereof, with each common wall tapered portion 29 opposing a tapered portion 29 of a respective inner wall 27 with a longitudinal gap 31 therebetween.

Figure 3:
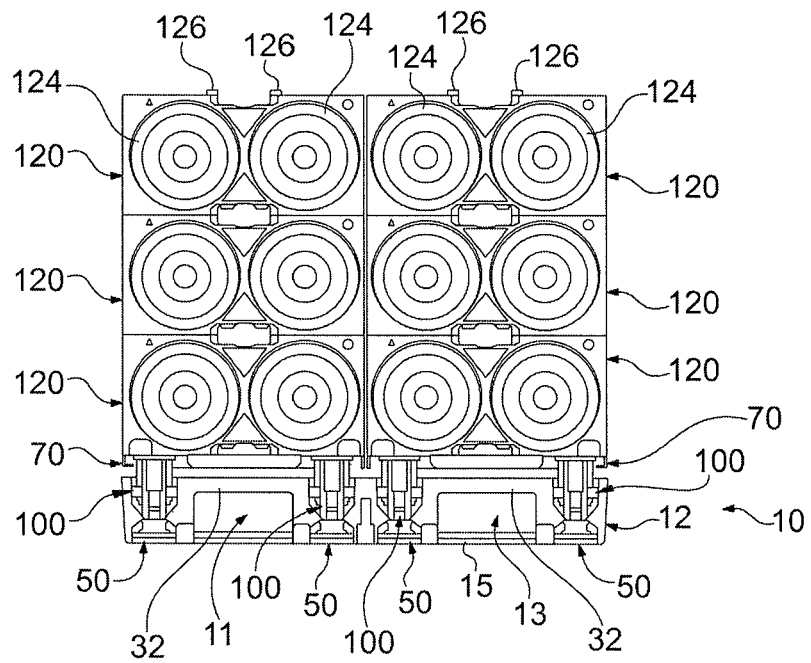
FIG. 3 is a front elevation view of the assembly of FIG. 1.
Figure 9:
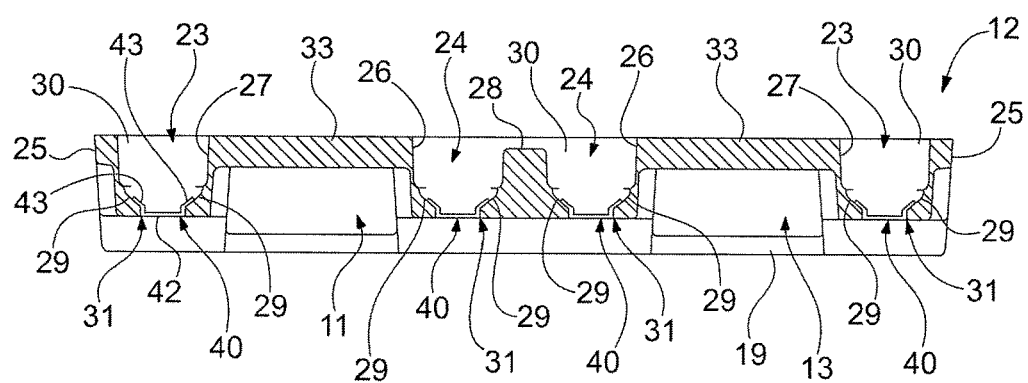
FIG. 9 is a cross-sectional view along the line 9-9 in FIG. 8.

Front and rear bridge portions 32 and 33 extend between the respective inner walls 27 of the side and intermediate channels 23, 24 to define an upper surface of the pallet 12. As illustrated in FIGS. 3 and 9, the bridge portions 32, 33 are spaced from the beams 15, 17 and 19 to define the longitudinal openings 11 and 13. The bridge portions 32, 33 may be formed as a continuous surface, however, openings 34, 35 may be left between the side and intermediate channels 23, 24 to reduce the amount of material, reduce weight and simplify manufacturing.

Figure 11:
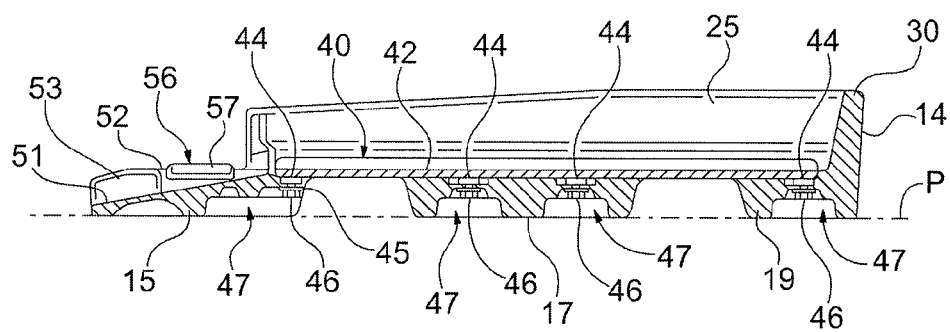
FIG. 11 is a cross-sectional view along the line 11-11 in FIG. 8.
Figure 12:
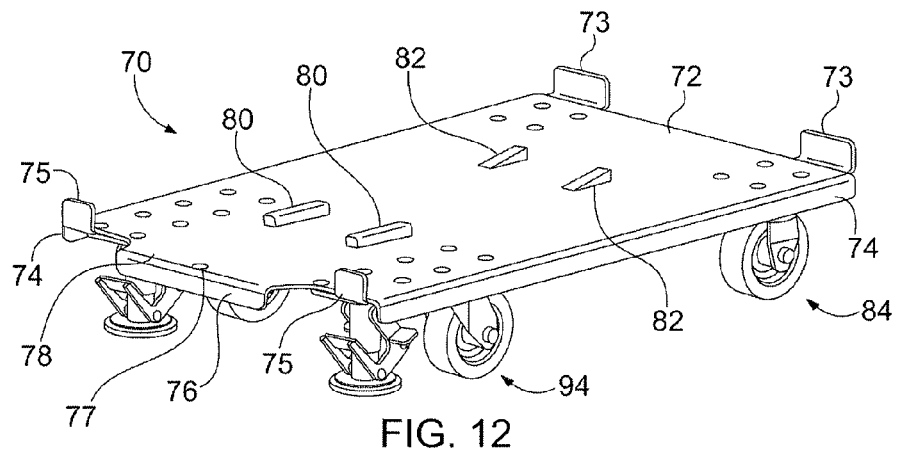
FIG. 12 is an isometric view of an exemplary dolly in accordance with an embodiment of the invention.

In the illustrated embodiment, each longitudinal gap 31 is open except where the gap 31 crosses the lateral beams 15, 17 and 19. With this configuration, a reinforcing track 40 is configured to be positioned within each longitudinal gap 31. Each track 40 includes a planar central surface 42 with tapered surfaces 43 extending outwardly therefrom and is manufactured from metal, reinforced thermoplastic or the like. The track 40 is received in a respective longitudinal gap 31 with the tapered surfaces 43 supported on the corresponding tapered portions 29. As shown in FIG. 11, bores 47 are provided through the beams 15, 17, 19 such that the tracks 40 may be secured to the pallet body 14 with the illustrated screws 44, washers 45 and nuts 46. The tracks 40 may be connected to the pallet body 14 in any desired matter, including but not limited to, molding of the pallet body 14 about the tracks 40. The walls 25, 27 and 28 and the tracks 40 are preferably configured such when a track 40 is secured within one of the channels 23, 24, the track planar surface 42 is parallel with the plane P defined by the beams 15, 17, 19. Alternatively, the configuration may be that the track planar surface 42 is sloped from front to back such that the dolly 70 is biased by gravity toward the rear wall 30.

While the exemplary embodiment of the pallet 12 includes separate tracks 40, the pallet 12 may be formed without such. For example, the longitudinal gap 31 may be formed as a continuous surface having a sufficient thickness or support structure to support a dolly, thereby eliminating the need for a separate track.

Figure 6:
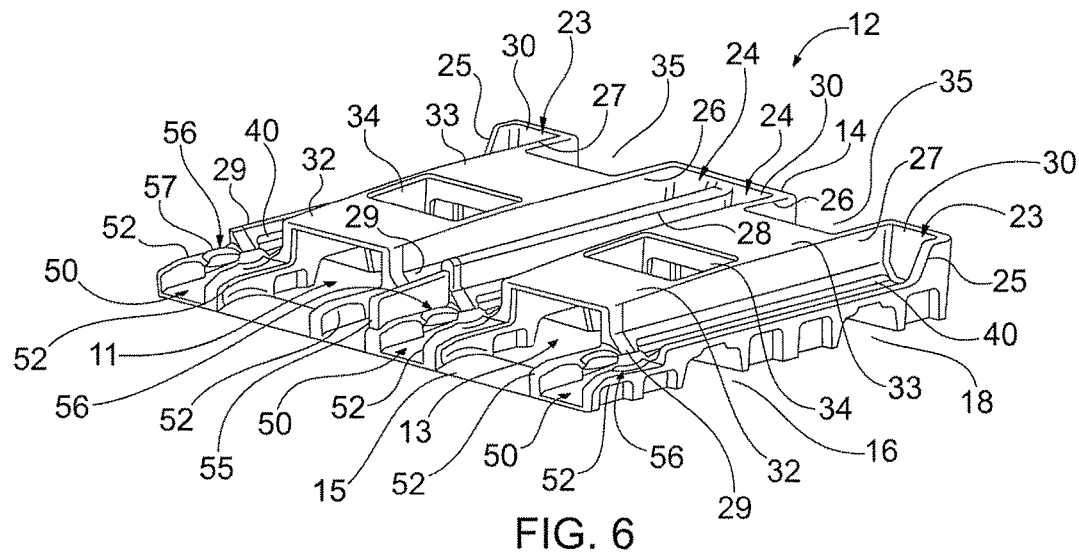
FIG. 6 is an isometric view of an exemplary pallet in accordance with an embodiment of the invention.
Figure 7:
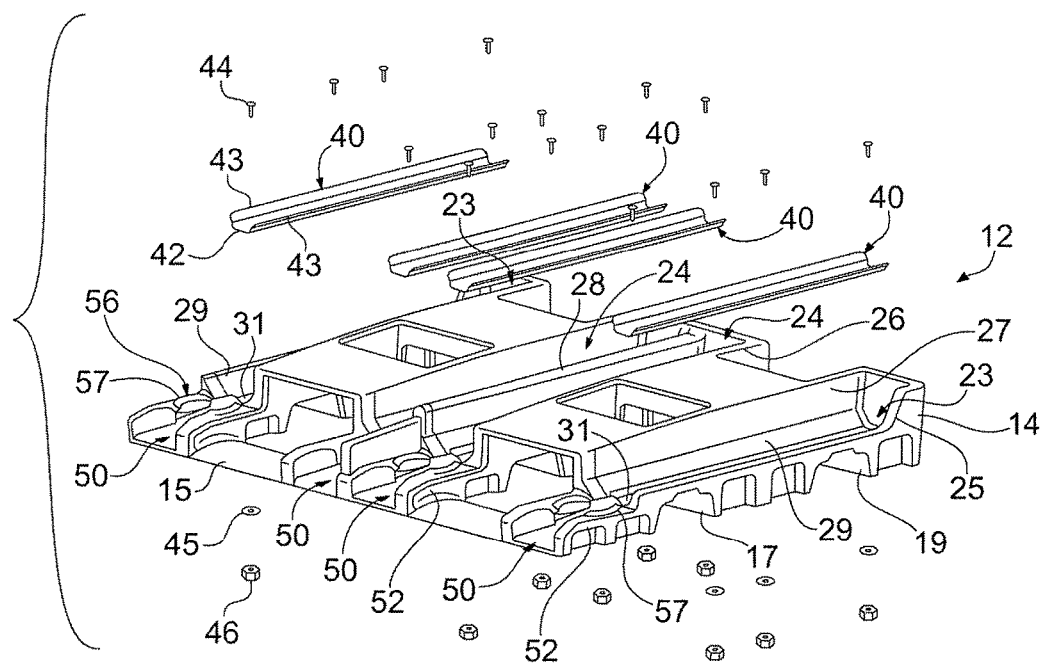
FIG. 7 is an exploded view of the exemplary pallet of FIG. 6.
Figure 8:
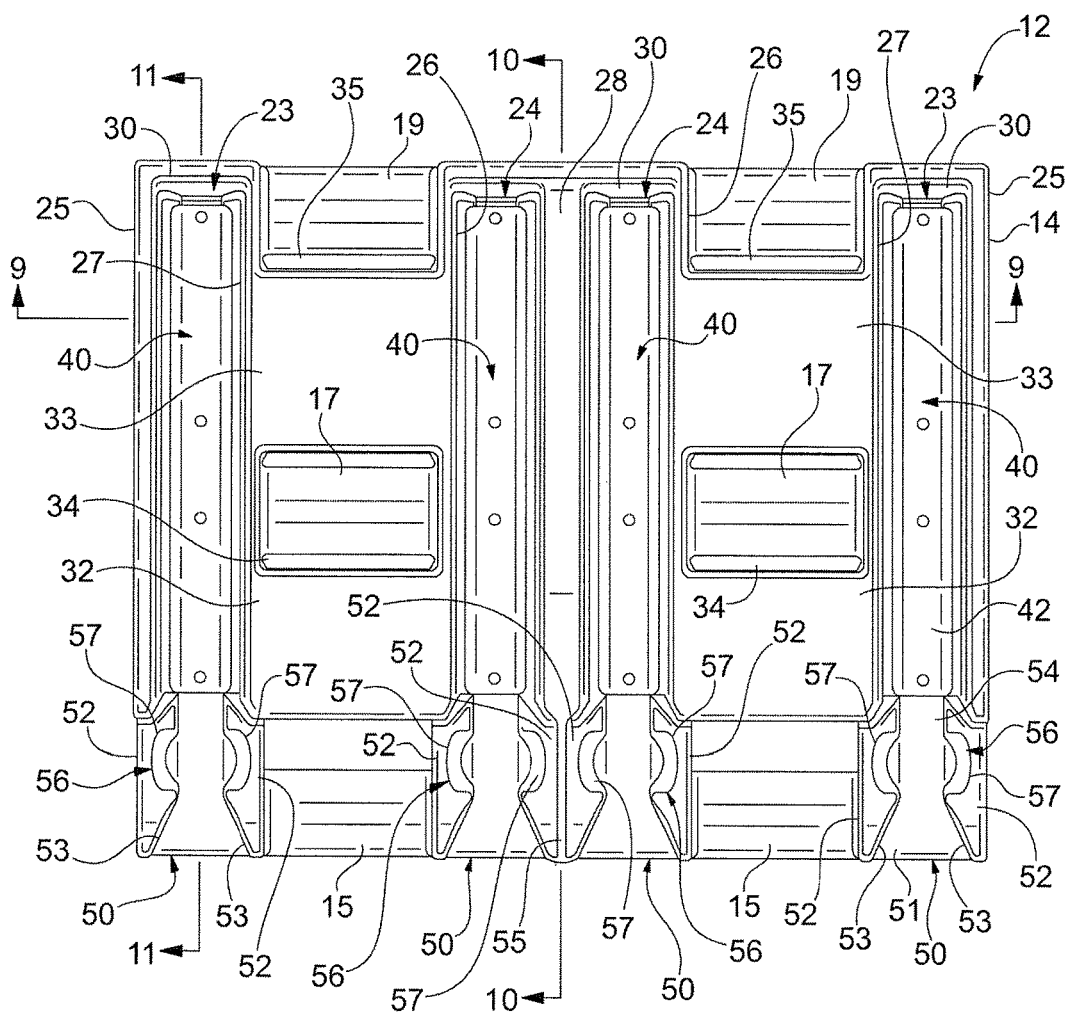
FIG. 8 is a top plan view of the exemplary pallet of FIG. 6.
Figure 10:
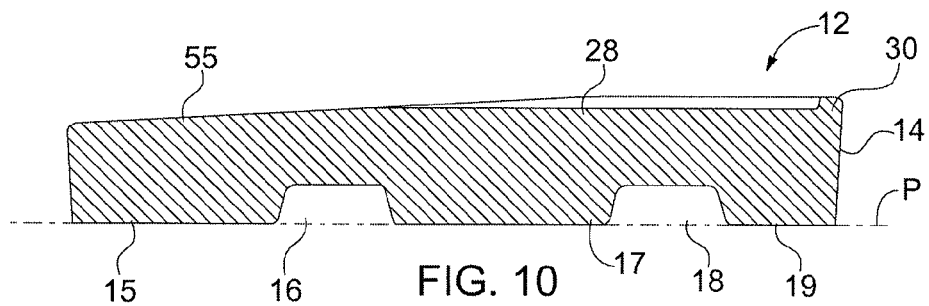
FIG. 10 is a cross-sectional view along the line 10-10 in FIG. 8.

Referring to FIGS. 6, 8 and 11, the walls 25, 27 and 28 continue forward of the tapered portions 29 and tracks 40 with reduced height walls 52 which connect to beam 15 and define the ramped opening 50. The wall 52 which is part of the common wall 28 may include an upwardly extending dividing portion 55 to reduce the chance of a wheel rolling to the wrong channel 24. As shown in FIG. 10, the beams 15, 17 and 19, the common wall 28, the rear wall 30 and the dividing portion 55 are preferably formed as an integral structure, however, each of the various components of the pallet 12 may be formed as separate components which are connected together.

An entry into each channel is defined by a ramped surface 51 extending between the walls 52 and extends from a lower most forward area to a height substantially equal to the height of the track planar surface 42. Each of the walls 52 preferably includes a tapered section 53 at the forward area such that a funnel like opening is defined and extends to a narrow section 54 with a width substantially equal to the width of the track planar portion 42. A locking recess 56 is defined into each set of opposed walls 52 across the narrow section 54. The recess 56 defines a stop shoulder 57 in each of the walls 52 and is configured to receive a portion of a respective locking member 100 on the dolly 70 as will be described hereinafter.

Referring to FIGS. 12-18, an exemplary dolly 70 will be described. The dolly 70 includes a support platform 72 configured to support a moveable item, in the illustrated embodiment, one or more storage racks. The support platform 72 may include depending walls 74, 76 to provide added rigidity to the support platform 72. As illustrated in FIG. 14, the support platform 72 may include an extended portion 78 which makes the dolly 70 accessible even with items positioned thereon. A connecting bore 77 may be provided to facilitate connection of a handle or the like to assist in moving the dolly 70. The edges of the support platform 72 may include upwardly extending boundary wall portions 73, 75 which help to retain items on the support platform 72. The support platform is preferably manufactured from metal, for example, steel, but may be manufactured from other materials, for example, plastic or thermoplastics.

Figure 13:
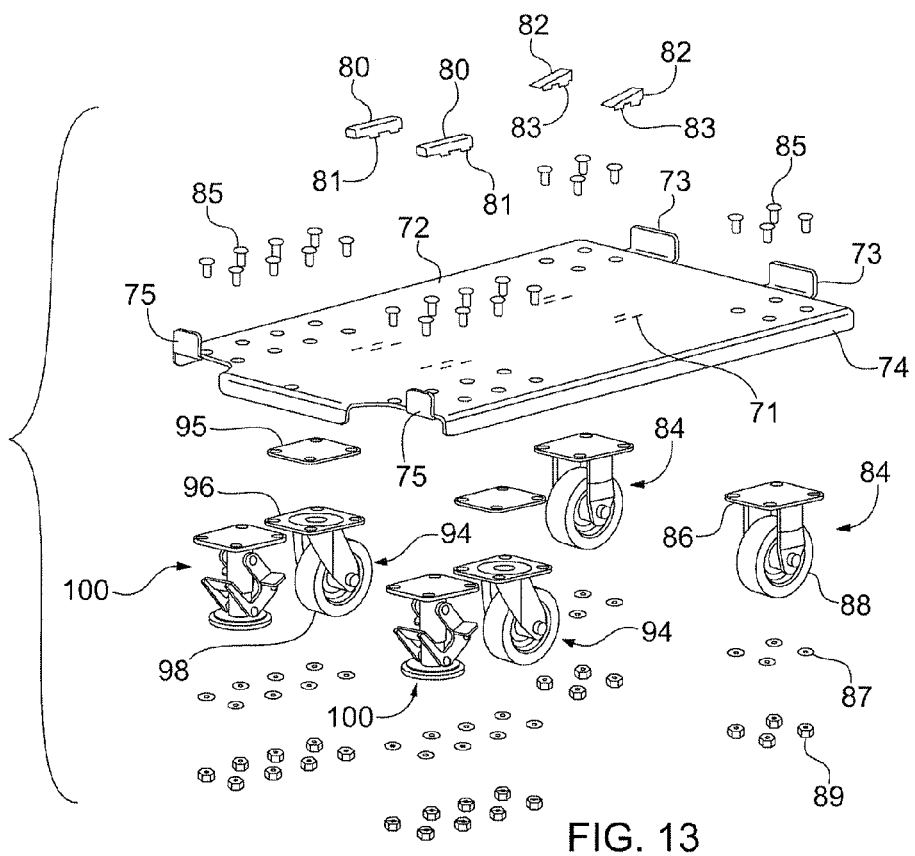
FIG. 13 is an exploded view of the exemplary dolly of FIG. 12.

In the present embodiment configured to support the storage racks of FIGS. 1-5, forward and rear cleats 80, 82 are provided on the support platform 72 and are positioned to engage the slots 123 and 125 in the rack 120. As illustrated in FIG. 13, the cleats 80, 82 include depending projections 81, 83, respectively, which are configured to engage and lock into slots 71 in the support platform 72. Depending on the configuration, the cleats 80, 82 may have different configurations, may be positioned differently or may not be required. The platform 72 may be provided with multiple slots 71 to allow cleats or other securing members to be interchanged and arranged in various configurations. Other connection assemblies, for example, straps or the like may be utilized to secure items to the dolly 70.

The dolly 70 includes a pair of rear wheel assemblies 84 and a pair of forward wheel assemblies 94 attached to the lower surface of the platform in any desired manner. The illustrated embodiment illustrates attachment of the wheel assemblies via screws 85, washers 87 and nuts 89. The illustrated rear wheel assemblies 84 include a wheel 88 secured via a non-rotating support structure 86. The illustrated front wheel assemblies 94 include a wheel 98 supported by a rotating support structure 96 and a reinforcing plate 95. The wheel assemblies are not limited to positioning as indicated and may be arranged in any desired manner. Additionally, either the front, rear or both wheel assemblies may be manufactured with a switching mechanism which allows them to be switched between rotating and non-rotating configurations. The rear wheel assemblies 84 are laterally spaced from one another a distance equal to the distance between the adjacent longitudinal gaps 31. Similarly, forward wheel assemblies 94 are laterally spaced from one another a distance equal to the distance between the adjacent longitudinal gaps 31.

A locking member 100 is secured at each side of the platform 72 forward of a respective forward wheel assembly 94. With reference to FIGS. 17 and 18, each of the exemplary locking members 100 includes a securing plate 102 with a first tube member 104 depending therefrom. A second tube member 106 is telescopingly associated with the first tube member 104 such that the second tube member 106 is axially extendible relative to the first tube member 104. A securing pad 108 is attached on the free end of the second tube member 106.

A pair of upper linkage members 114 each having a linear configuration are pivotally connected at one end thereof to the upper tube member 104 at pivot point 113. A pair of lower linkage members 110 having an L-shaped configuration are joined together via a locking plate 112 at one end thereof and are pivotally connected to the upper linkages 114 at pivot points 113. An intermediate portion of each lower linkage member 110 is pivotally connected to the second tube member 106 at pivot point 111. Each lower linkage member 110 further includes a release plate 116 adjacent its pivotally connected end.

Figure 4:
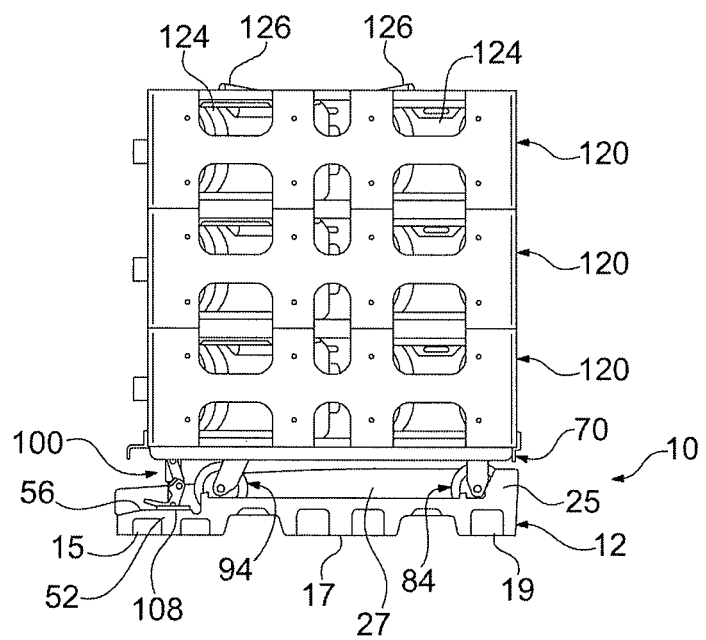
FIG. 4 is a side elevation view of the assembly of FIG. 1.

FIG. 17 illustrates the locking member 100 in an locking position. In this position, the locking plate 112 has been pushed in the direction A. As a result, the lower linkage 110 has pivoted about pivot point 111 and caused the opposite end of the lower linkage 110 and the upper linkage 114 to pivot about pivot point 115 to a more linear configuration with the second tube 106, and thereby the securing pad 108, extended further from the upper tube 104. In this position, the securing pad 108 is spaced a distance from the securing plate 102 which is equal to or greater than the height of the front wheel assemblies 94 such that the securing pad 108 will be received in a respective locking recess 56 in the pallet 12, as illustrated in FIG. 4. Preferably, the securing pads 108 and locking recesses 56 have complimentary configurations such that engagement of the pads 108 into the recesses 56 causes a desired alignment and registration between the dolly 70 and the pallet 12. The recesses 56 may have a tapered structure, see FIGS. 6 and 7, to guide the pads 108 into the recesses 56. This achieves a repeatable and accurate registration of the dollies 70, and therefore the contents of the dollies 70, with the pallet 12. Such registration may be important in various applications, for example, when automated, robotic loading is used to load the product onto the dollies or the racks. The locking and registration may also be accomplished by other components, assemblies or mechanisms on either the dolly or mechanisms on the pallet used together with or in lieu of the illustrated locking members 100.

With the dolly 70 positioned in the respective channels 23, 24 and the locking members 100 in the locking position, the dolly 70 and pallet 12 form an integrated structure that may be moved together using the openings 11, 13 or 16, 18.

To load or unload a dolly 70 relative to the pallet 12, the locking member 100 is moved to the unlocked or moved position illustrated in FIG. 18. To move the locking member 100, the release plates 116 are moved in the direction of arrow B such that the linkages 114 and 110 pivot relative to one another with the angled configuration lifting the second tube member 106 and thereby the securing pad 108. In the move position, the pad 108 is clear of the recess 56 and walls 52 such that the dolly 70 may be wheeled onto or off of the pallet via the ramped surfaces 71.

With the locking members 100 in a move position, the dollies 70 can be removed from the pallet 12 and easily moved via the wheels 88, 98. The dollies 70 can move multiple stored items to a final location without the need to move the items one at a time. Additionally, the dollies 70 can be wheeled off of transportation units via a ramp or the like, thereby eliminating the need for bulk handling equipment to remove the pallet 12 from the transportation unit.

Referring to FIGS. 19-27, an alternative exemplary embodiment of a dolly pallet assembly 10' including an alternative exemplary pallet 12' and an alternative exemplary dolly 70' will be described. The pallet 12' is substantially the same as in the previous embodiment except that the pallet 12' does not include any locking recesses as in the previous embodiment and some of the components may be differently sized. Instead of the recesses, the locking member 100' on the dolly 70' functions independent of the pallet 12', as will be described hereinafter. The pallet 12' may be used with any wheeled rack system which includes a means for locking at least one wheel against movement. The pallet 12' is again illustrated used in conjunction with water bottle racks 120, but is not limited to such and may be used with any wheeled racks including a locking means, for example, bread racks, etc. As an example of a differently sized component, the reinforcing tracks 40' of the present embodiment are narrower but taller than the reinforcing tracks 40 in the previous embodiment. Other scale modifications are within the scope of the present invention. Common element numbers are used on the pallets 12 and 12' and therefore the common features of pallet 12' are not described again in detail.

Figure 25:
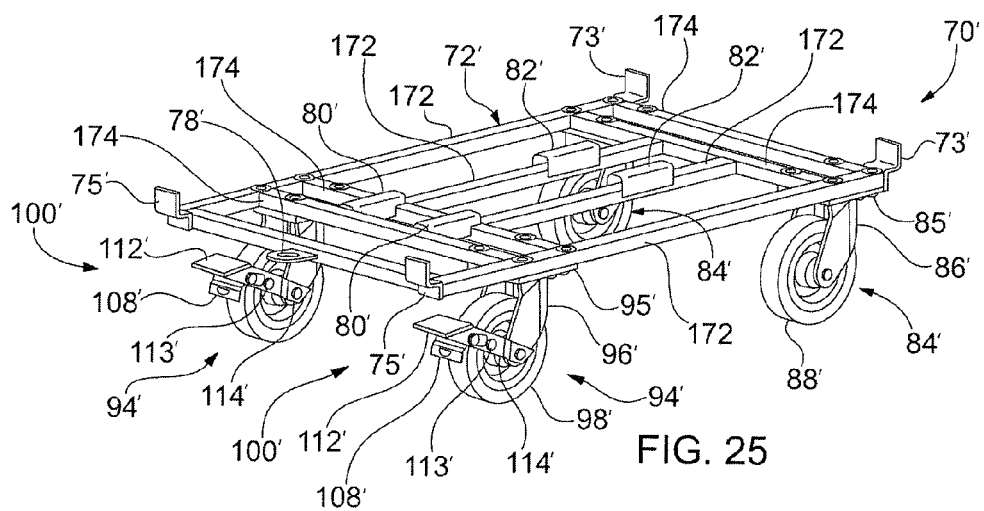
FIG. 25 is an isometric view of another exemplary dolly in accordance with an embodiment of the invention.
Figure 26:
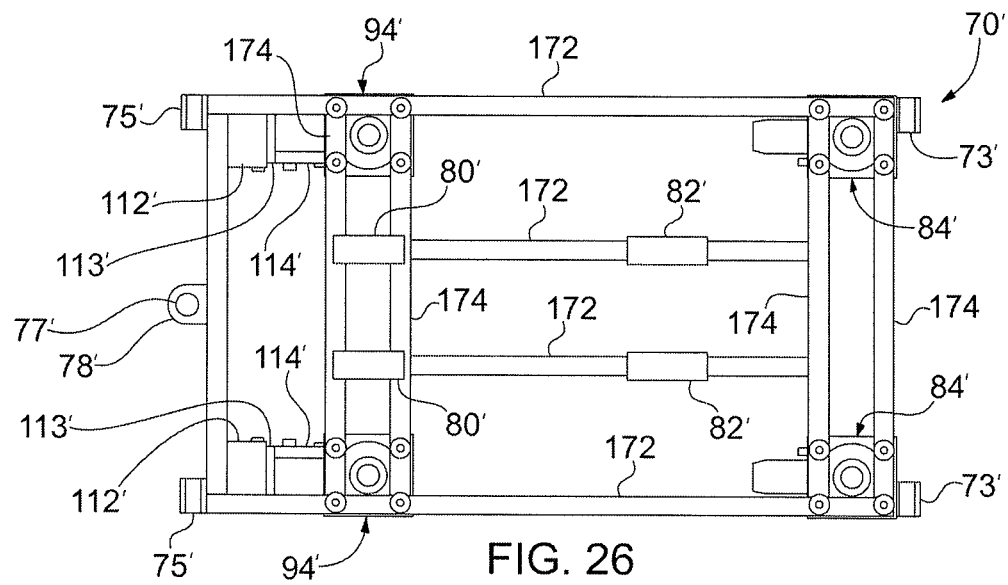
FIG. 26 is a top plan view of the exemplary dolly of FIG. 25.
Figure 27:
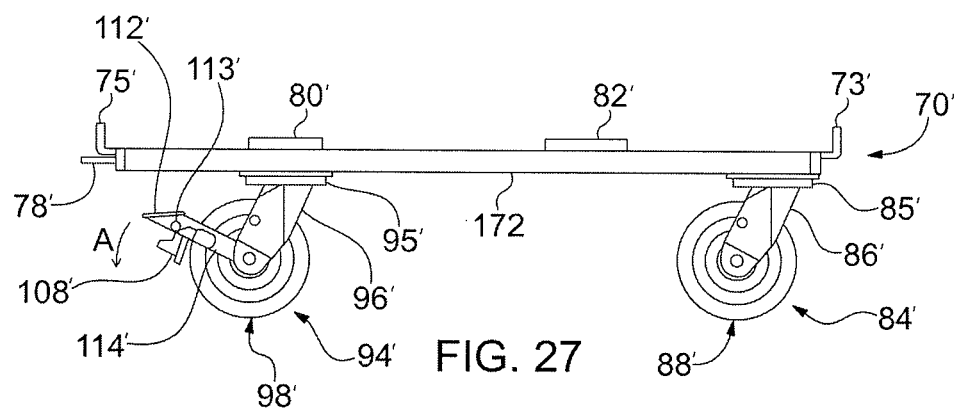
FIG. 27 is a side elevation view of the exemplary dolly of FIG. 25.

Referring to FIGS. 25-27, an alternative exemplary dolly 70' will be described. The dolly 70' of the present embodiment includes an open support platform 72' configured to support a moveable item, in the illustrated embodiment, one or more storage racks. The open support platform 72' is defined by a plurality of longitudinal rails 172 interconnected with a plurality of lateral rails 174. As illustrated in FIG. 26, the support platform 72' may include an extended portion 78' which makes the dolly 70' accessible even with items positioned thereon. A connecting bore 77' may be provided to facilitate connection of a handle or the like to assist in moving the dolly 70'. The edges of the support platform 72' may include upwardly extending boundary wall portions 73', 75' which help to retain items on the support platform 72'. The support platform is preferably manufactured from metal, for example, steel, but may be manufactured from other materials, for example, plastic or thermoplastics.

In the present embodiment configured to support the storage racks of FIGS. 1-5 and 19, forward and rear cleats 80', 82' are provided on the support platform 72' and are positioned to engage the slots 123 and 125 in the rack 120. The cleats 80', 82' are preferably configured to fit about and connect to the longitudinal rails 172. Depending on the application, the cleats 80', 82' may have different configurations, may be positioned differently or may not be required. Other connection assemblies, for example, straps or the like may be utilized to secure items to the dolly 70'. While the dolly 70' of the present embodiment includes an open support platform 72', the dolly 70' may have a planar support as in the first embodiment and the dolly 70 of the first embodiment may have an open support frame, or combinations thereof.

The dolly 70' includes a pair of rear wheel assemblies 84' and a pair of forward wheel assemblies 94' attached to the lower surface of the platform in any desired manner. In the present embodiment, both the illustrated rear wheel assemblies 84' and the illustrated front wheel assemblies 94' include a wheel 88', 98' supported by a rotating support structure 86', 96' and a reinforcing plate 85', 95'. The wheel assemblies are not limited to positioning as indicated and may be arranged in any desired manner. Additionally, either the front, rear or both wheel assemblies may be manufactured with a switching mechanism which allows them to be switched between rotating and non-rotating configurations. The rear wheel assemblies 84' are laterally spaced from one another a distance equal to the distance between the adjacent longitudinal gaps 31. Similarly, forward wheel assemblies 94' are laterally spaced from one another a distance equal to the distance between the adjacent longitudinal gaps 31.

Figure 19:
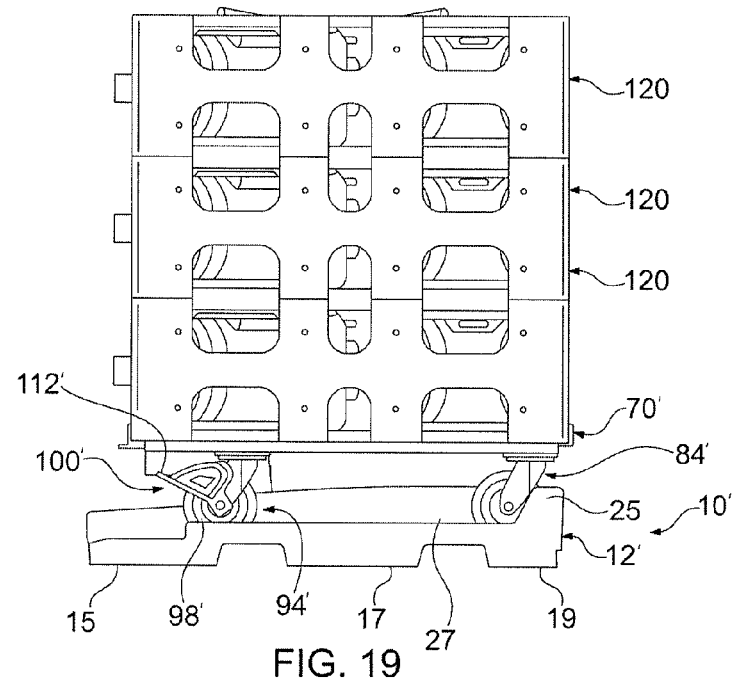
FIG. 19 is a side elevation view of a dolly pallet assembly in accordance with another embodiment of the invention supporting exemplary bottled water storage racks.
Figure 20:
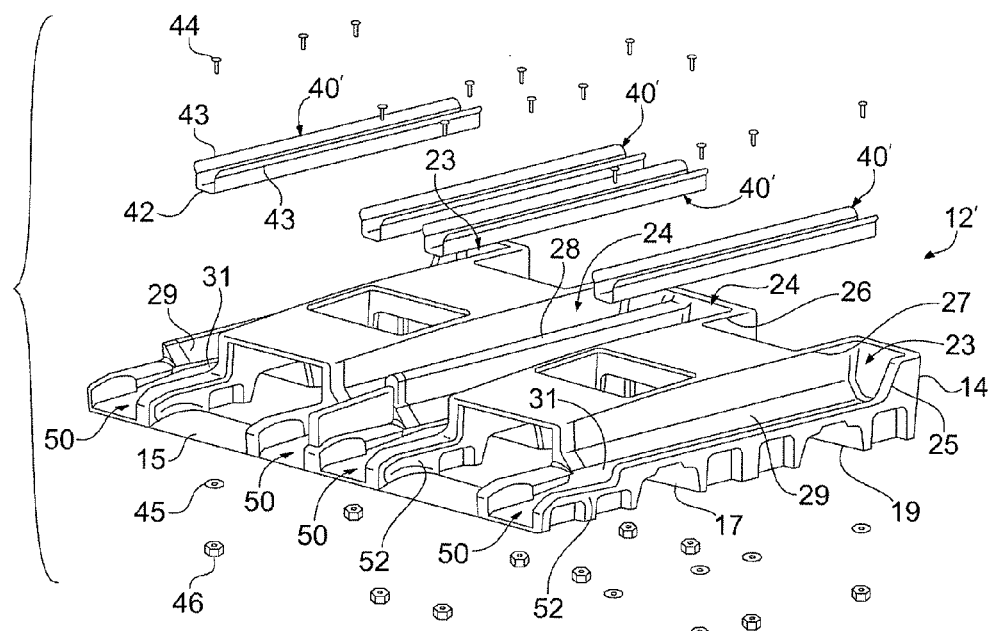
FIG. 20 is an exploded view of the exemplary pallet of the assembly FIG. 19.
Figure 21:
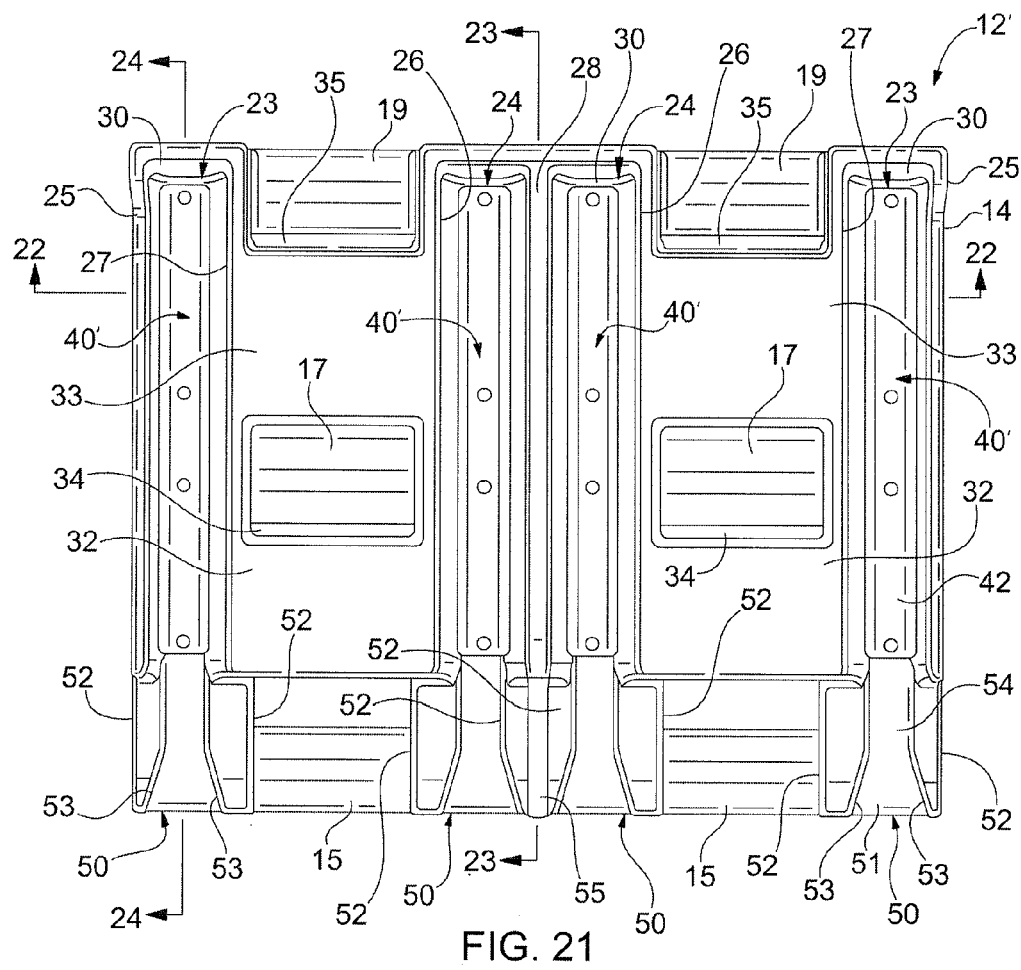
FIG. 21 is a top plan view of the exemplary pallet of the assembly FIG. 19.
Figure 22:
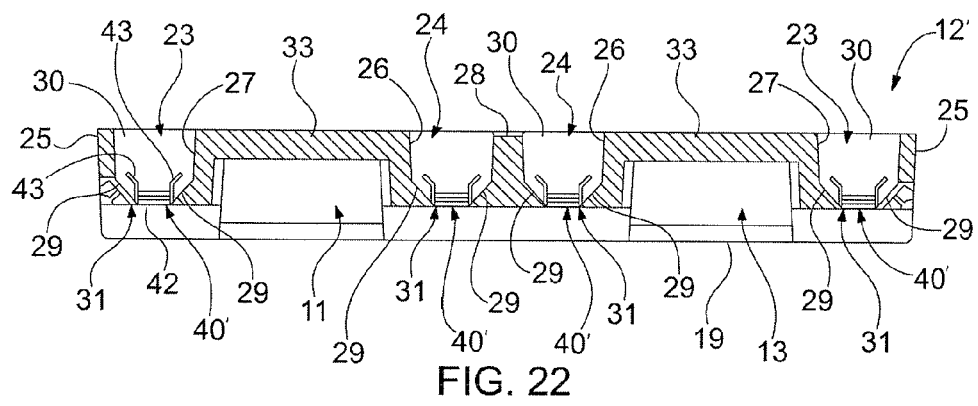
FIG. 22 is a cross-sectional view along the line 22-22 in FIG. 21.
Figure 23:
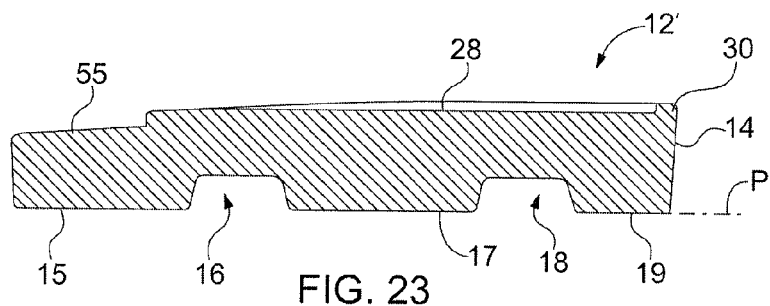
FIG. 23 is a cross-sectional view along the line 23-23 in FIG. 21.
Figure 24:
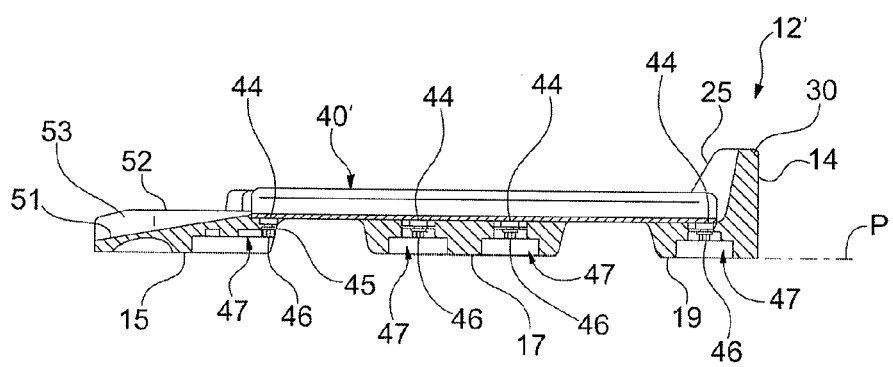
FIG. 24 is a cross-sectional view along the line 24-24 in FIG. 21.

A locking member 100' is secured to each forward wheel assembly 94'. The exemplary locking members 100' includes a securing pad 108' connected to a step plate 112' which is pivotally connected to the respective support structure 96' via linkages 113', 114'. FIGS. 19, 25 and 27 illustrate the locking member 100' in an locking position. In this position, the step plate 112' has been pushed in the direction A. As a result, the securing pad 108 is pivoted into frictional contact with the respective wheel 98'. Preferably the linkage 113', 114' is configured such that the step plate 112' is secured in the locking position until a further force is applied thereto. To release the locking member 100', the step plate 112' is pushed in the unlocking manner and the securing pad 108' pivots to a non-engaged position.

With the dolly 70' positioned in the respective channels 23, 24 and the locking members 100' in the locking position as shown in FIG. 19, the dolly 70' and pallet 12' are secured from relative movement and may be moved together using the openings 11, 13 or 16, 18. To load or unload a dolly 70' relative to the pallet 12', the locking member 100' is moved to the unlocked or move position. With the locking members 100' in a move position, the dollies 70' can be removed from the pallet 12' and easily moved via the wheels 88', 98'. The dollies 70' can move multiple stored items to a final location without the need to move the items one at a time. Additionally, the dollies 70' can be wheeled off of transportation units via a ramp or the like, thereby eliminating the need for bulk handling equipment to remove the pallet 12' from the transportation unit.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A pallet comprising a unitary pallet body extending from a front lateral beam to a rear lateral beam with the at least the front and rear lateral beams defining a bottom support surface of the pallet body, and the pallet body defining at least two channels therein, each channel including side walls and a channel bottom surface with at least a portion thereof spaced a first height relative to the pallet body bottom surface, and an entry into each channel defined by the pallet body, each entry including a ramped surface defined by the front lateral beam such that the ramped surface slopes from a front edge of the front lateral beam at a second height relative to the pallet body bottom support surface to a third height relative to the pallet body bottom support surface adjacent the channel bottom surface, wherein the second height is less than the first and third heights, wherein at least two fork-lift tine openings are defined across the body, each of the at least two fork-lift tine openings defining a tine contact surface which is below the first height, wherein the lateral beams, ramped surface, and pallet body remains fixed in location and orientation throughout the entire operation of the pallet.

2. The pallet of claim 1 wherein the first and third heights are substantially equal.

3. The pallet of claim 1 wherein the portion of the channel bottom surface adjacent the ramped surface is at the first height and an opposite end of the channel bottom surface is at a fourth height which is less than the first height such that the channel is sloped from the portion of the channel bottom surface adjacent the ramped surface to the opposite end of the channel bottom surface.

4. The pallet of claim 1 wherein the pallet body is manufactured from a polymer.

5. The pallet of claim 1 wherein a reinforcing track is secured in each channel.

6. The pallet of claim 5 wherein each reinforcing track is manufactured from metal or reinforced thermoplastic.

7. The pallet of claim 1 comprising at least four channels with an entry into each channel.

8. The pallet of claim 1 wherein at least two additional fork-lift tine openings extending parallel with the channels are defined in the body.

9. The pallet of claim 1 wherein the at least two fork-lift tine openings extend perpendicular to the channels.

10. The pallet of claim 1 wherein the pallet body includes an end wall at the end of each channel opposite the respective entry.

11. The pallet of claim 1 wherein a locking recess is defined in the pallet body adjacent at least one of the entries.

12. A dolly pallet assembly comprising:
a pallet of claim 1; and
a dolly including a support platform with a plurality of wheel assemblies and at least one locking member,
wherein the dolly is positionable relative to the pallet with the wheels received in respective channels and the locking member selectively engageable to lock the dolly relative to the pallet.

13. The dolly pallet assembly of claim 12 wherein the dolly includes two rear wheels laterally spaced apart a first distance and two forward wheels laterally spaced apart the first distance and wherein the at least two channels are laterally spaced apart the first distance.

14. The dolly pallet assembly of claim 12 wherein the at least one lock member is secured to a respective wheel assembly and includes a securing pad moveable between an unlocked position wherein the securing pad is clear of a wheel of the wheel assembly and a locking position wherein the securing pad frictionally engages the wheel.

15. The dolly pallet assembly of claim 12 wherein a securing recess is defined in the pallet body adjacent one of the entries and the at least one lock member extendable between a locking position wherein a securing pad of the lock member is received in the securing recess and an unlocked position wherein the securing pad is clear of the securing recess.

16. The dolly pallet assembly of claim 12 wherein the support platform defines a planar structure.

17. The dolly pallet assembly of claim 12 wherein the support platform defines an open frame structure.

18. The dolly pallet assembly of claim 12 wherein one or more securing cleats extend from the support platform and are configured to engage a rack positioned on the platform.

19. The dolly pallet assembly of claim 18 wherein the rack is a water bottle storage rack.

* * * * *